(12) United States Patent
Sok

(10) Patent No.: US 11,841,100 B2
(45) Date of Patent: Dec. 12, 2023

(54) PIPE FIXING DEVICE AND METHOD FOR MANUFACTURING THE SAME

(71) Applicant: Jung Chul Sok, Seongnam-si (KR)

(72) Inventor: Jung Chul Sok, Seongnam-si (KR)

( * ) Notice: Subject to any disclaimer, the term of this patent is extended or adjusted under 35 U.S.C. 154(b) by 0 days.

(21) Appl. No.: 17/800,541

(22) PCT Filed: Jan. 12, 2021

(86) PCT No.: PCT/KR2021/000410
§ 371 (c)(1),
(2) Date: Aug. 18, 2022

(87) PCT Pub. No.: WO2021/172741
PCT Pub. Date: Sep. 2, 2021

(65) Prior Publication Data
US 2023/0079642 A1 Mar. 16, 2023

(30) Foreign Application Priority Data
Feb. 26, 2020 (KR) .................. 10-2020-0023598

(51) Int. Cl.
*F16L 3/24* (2006.01)
*C04B 18/14* (2006.01)
*F16L 3/02* (2006.01)

(52) U.S. Cl.
CPC .............. *F16L 3/24* (2013.01); *C04B 18/141* (2013.01); *F16L 3/02* (2013.01)

(58) Field of Classification Search
CPC ..... F16L 3/24; F16L 3/02; F16L 3/243; C04B 18/141
See application file for complete search history.

(56) References Cited

U.S. PATENT DOCUMENTS

| D738,711 S | * | 9/2015 | Tally | ............................. D8/380 |
| 2007/0120036 A1 | * | 5/2007 | Olle | .................... F24F 13/0254 |
| | | | | 248/615 |
| 2008/0054143 A1 | * | 3/2008 | Collins | ..................... F16L 3/02 |
| | | | | 248/227.2 |

(Continued)

FOREIGN PATENT DOCUMENTS

| CN | 110054500 A | * | 7/2019 |
| JP | 3003090 U | * | 8/1994 |

(Continued)

OTHER PUBLICATIONS

Eaton pipe hangers and supports catalog for B-Line series, dated 2019, https://www.eaton.com/content/dam/eaton/products/support-systems/pipe-hangers/pipe-straps/pipe-hanger-and-supports-ca310001en.pdf (Year: 2019).*

(Continued)

*Primary Examiner* — Terrell L McKinnon
*Assistant Examiner* — Ding Y Tan
(74) *Attorney, Agent, or Firm* — Revolution IP, PLLC

(57) ABSTRACT

A pipe fixing device includes a fixing portion formed in a channel shape in which a first space therein is opened to an outside through an opening formed in an upper portion; and a support coupled to a lower portion of the fixing portion and made of steel-making slag, wherein a part of upper end edges of the fixing portion corresponding to a front and a rear of the opening is formed to be bent toward the first space.

4 Claims, 9 Drawing Sheets

(56) References Cited

U.S. PATENT DOCUMENTS

2009/0272856 A1\* 11/2009 Azuma .................... F16L 3/04
                                                    248/49
2012/0025034 A1\* 2/2012 Turner .................... F16L 3/04
                                                    248/65

FOREIGN PATENT DOCUMENTS

| JP | 3003090 U | 10/1994 |
| JP | 08-042761 A | 2/1996 |
| JP | H 0842761 A \* | 2/1996 |
| KR | 20-0172793 Y1 | 3/2000 |
| KR | 10-0663267 B1 | 1/2007 |
| KR | 10-2009-0051729 A | 5/2009 |
| KR | 20090051729 A \* | 5/2009 |
| KR | 101157504 B1 \* | 5/2012 |
| KR | 10-1458417 B1 | 11/2014 |
| KR | 101687662 B1 \* | 12/2016 |
| KR | 10-2008820 B1 | 8/2019 |

OTHER PUBLICATIONS

Dura-Blok pipe support block sold on amazon dated May 17, 2013, https://www.amazon.com/Pipe-Support-Block-200-Load/dp/B00C75PCE0 (Year: 2013).\*

International Search Report for PCT/KR2021/000410 dated Apr. 6, 2021 from Korean Intellectual Property Office.

\* cited by examiner

[Figure 1]
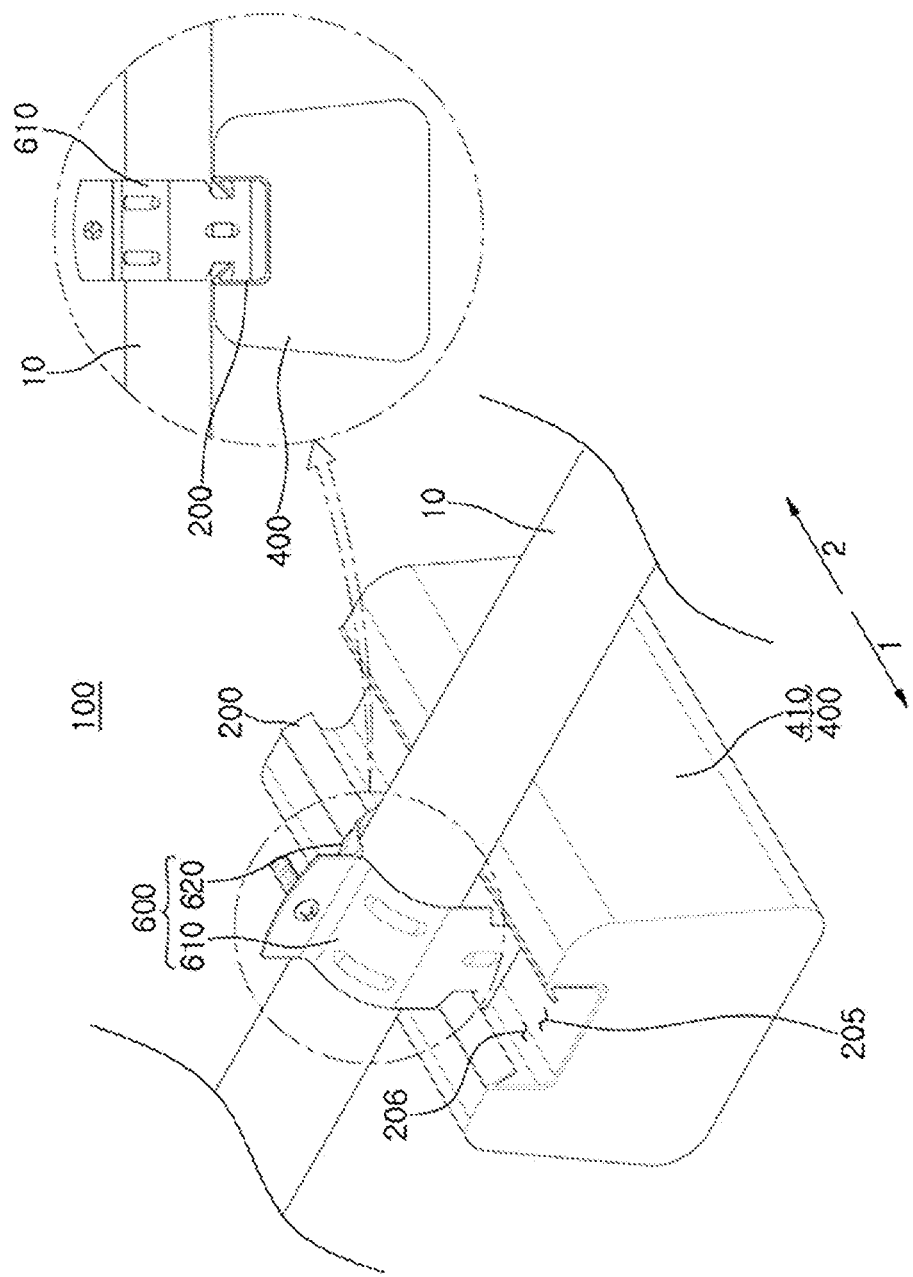

[Figure 2]
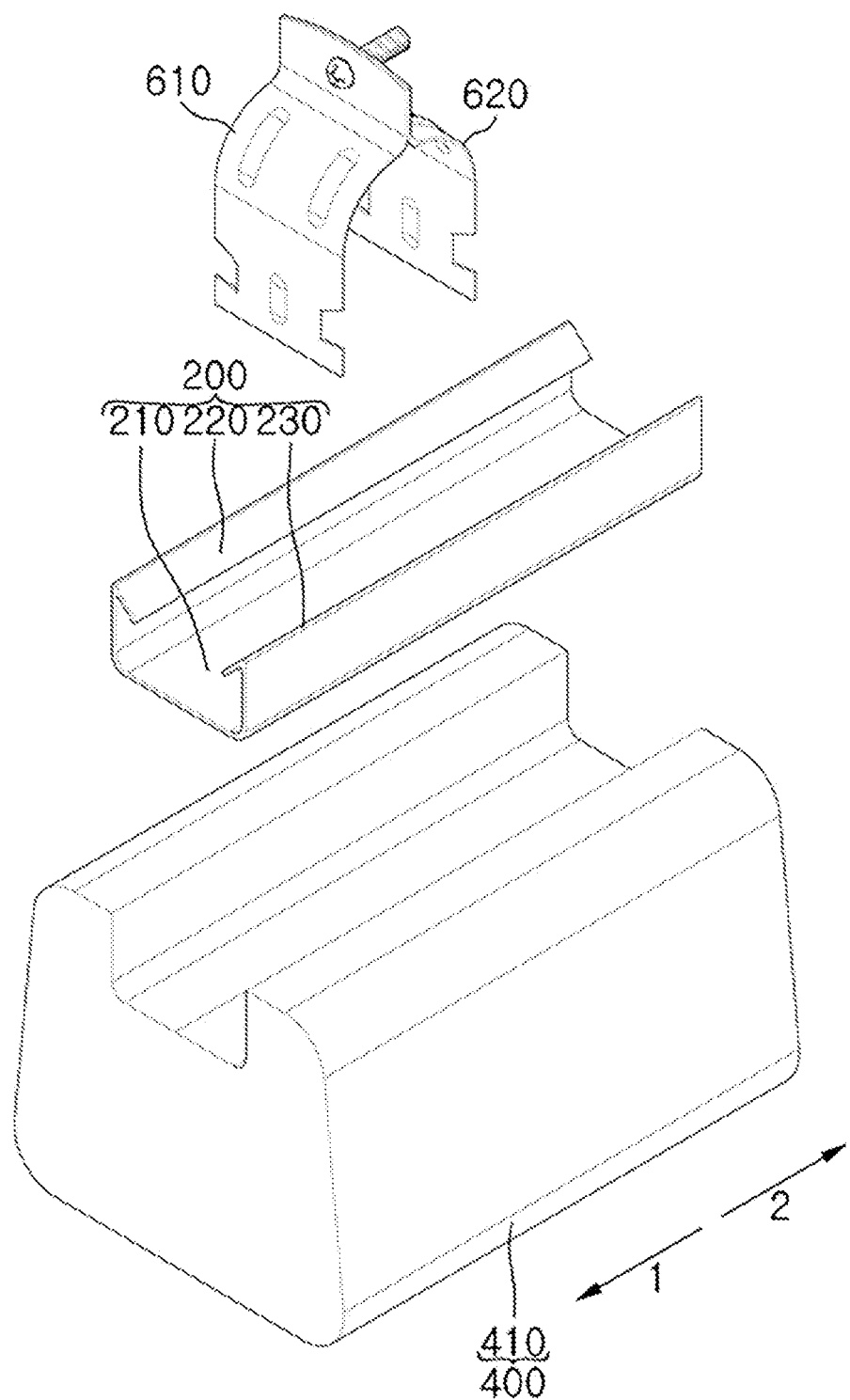

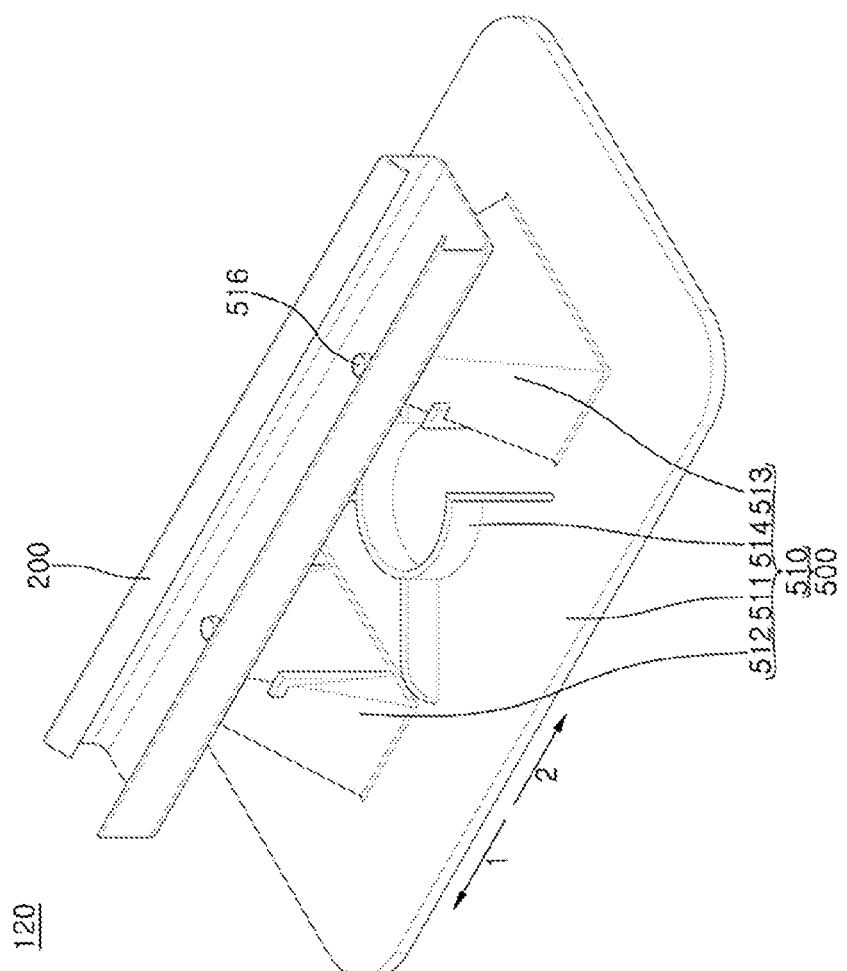
[Figure 3]

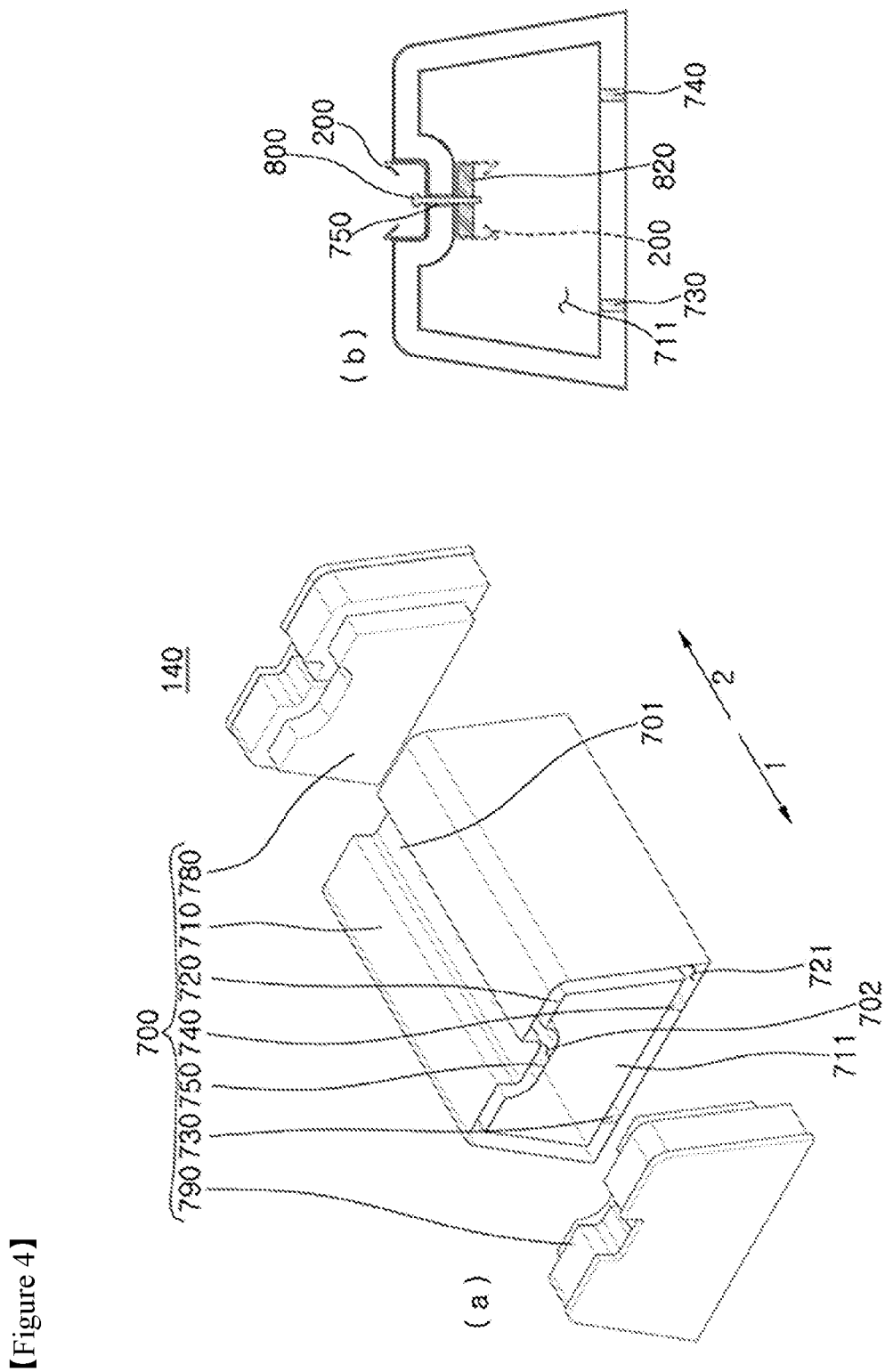
[Figure 4]

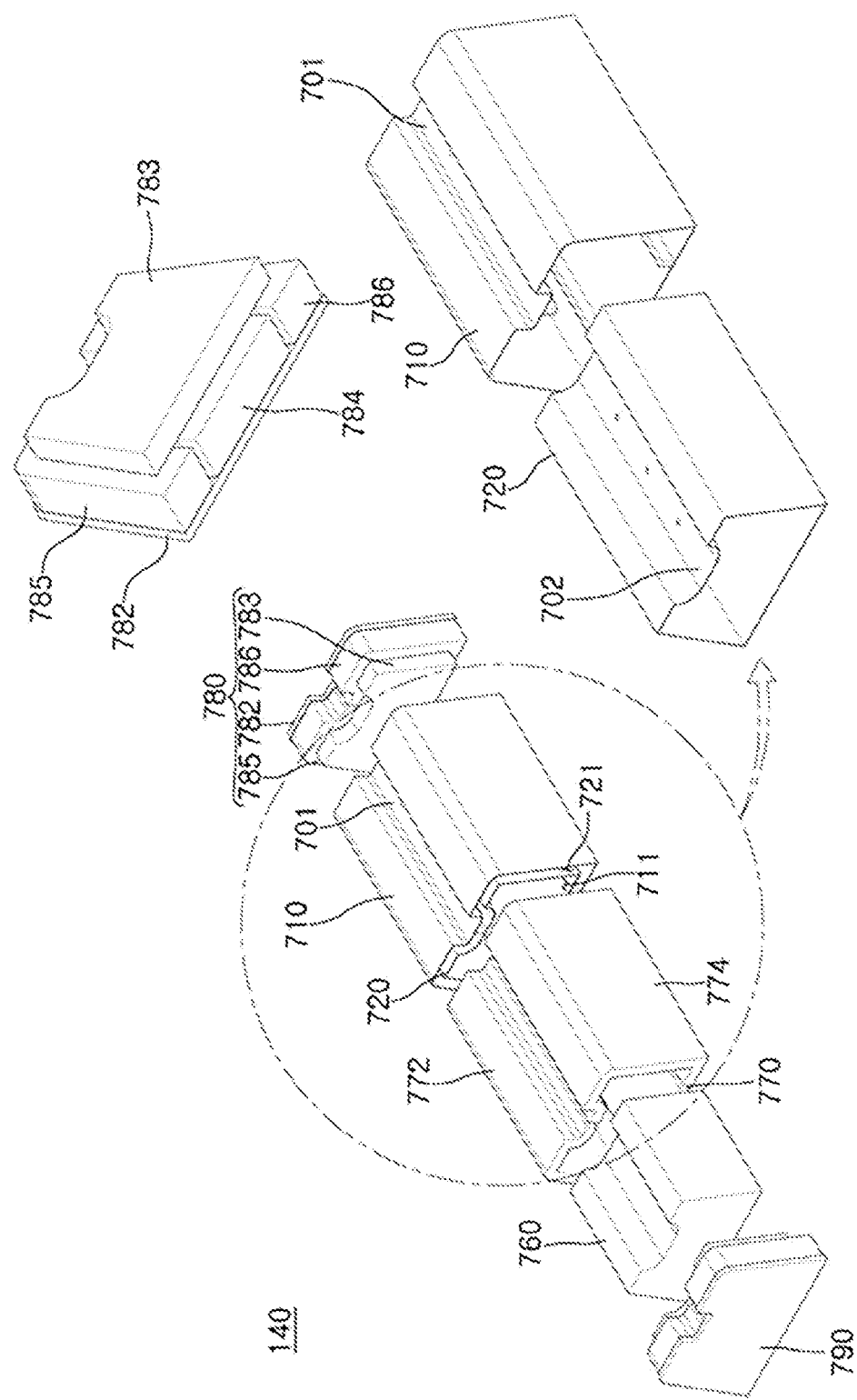
[Figure 5]

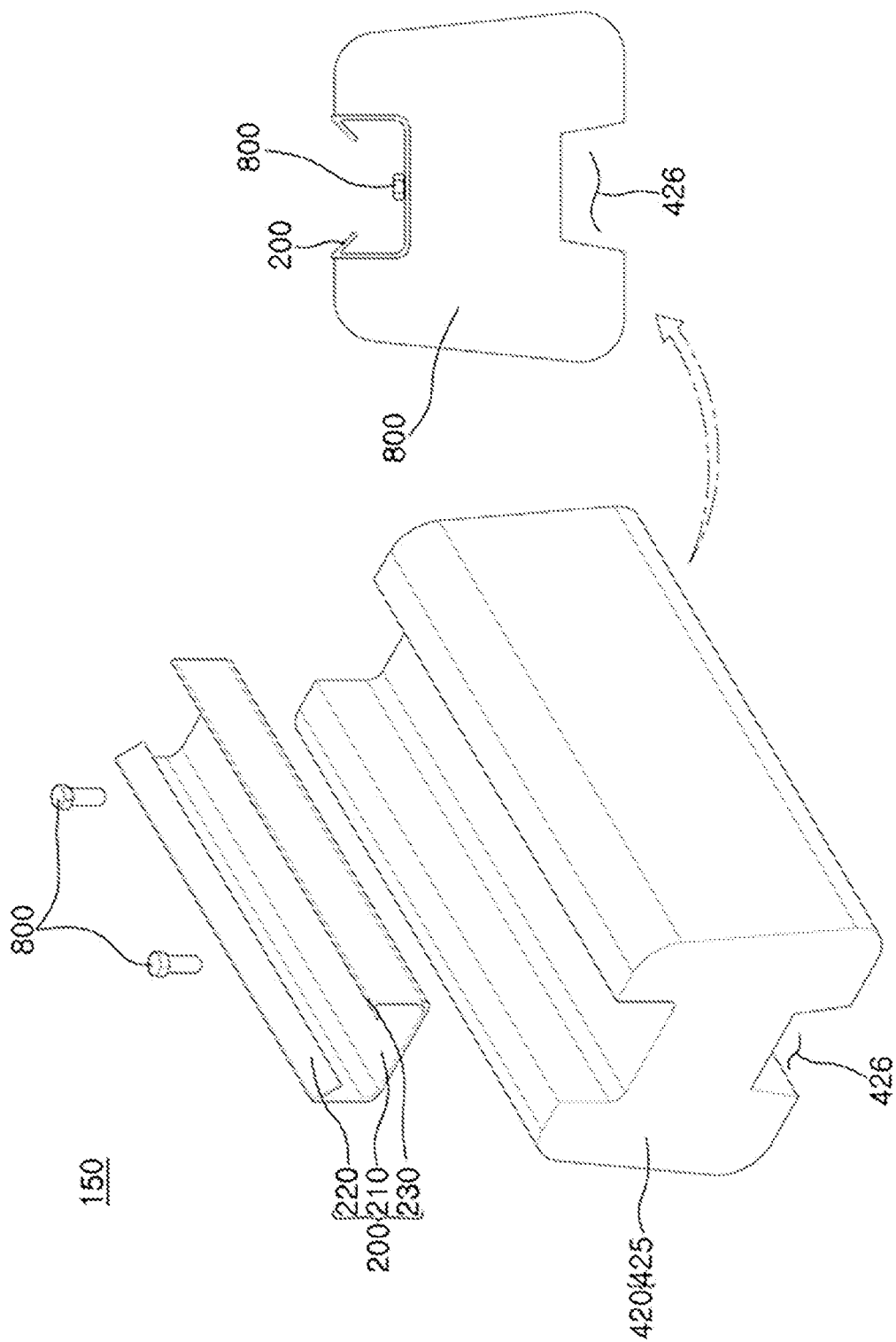

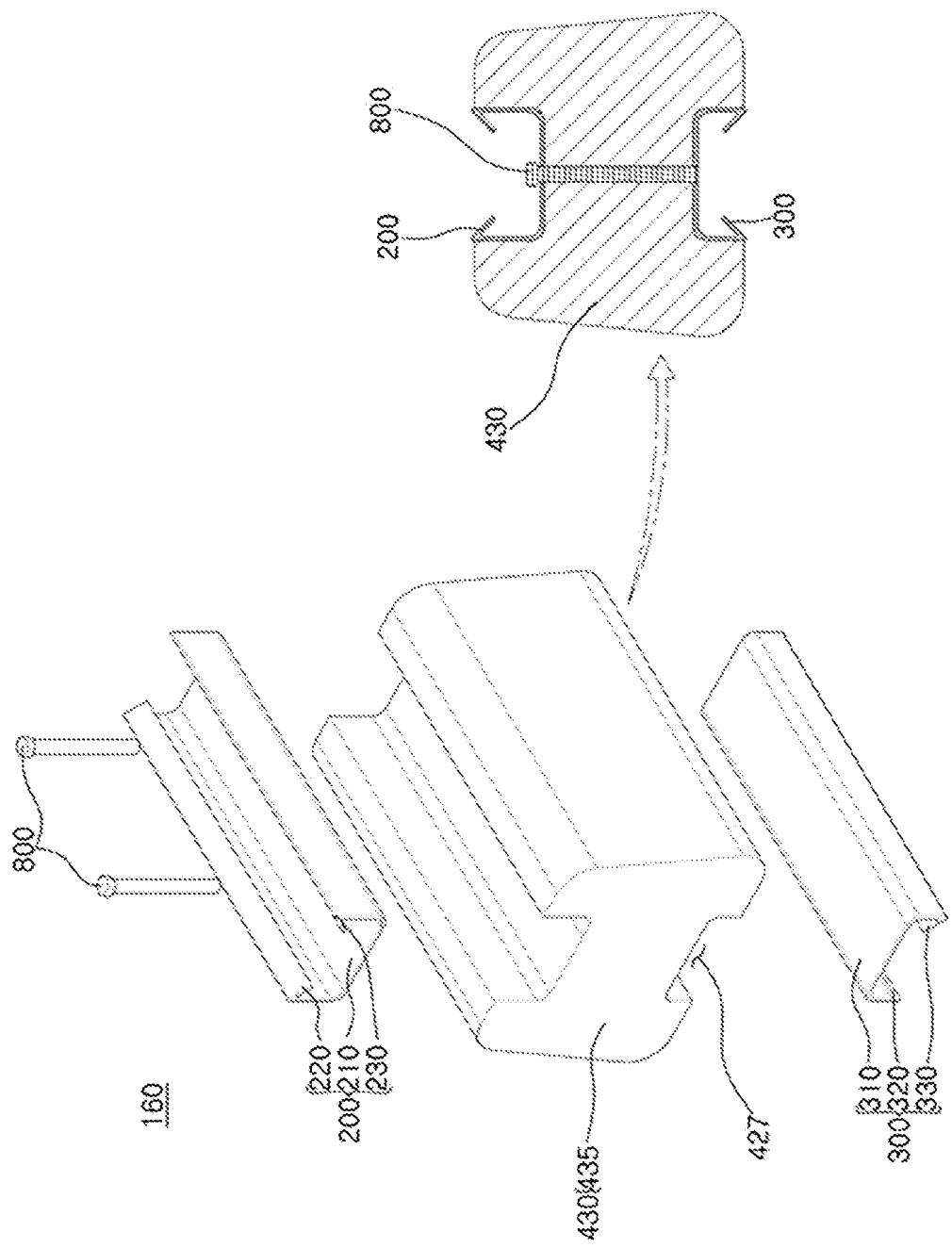
[Figure 7]

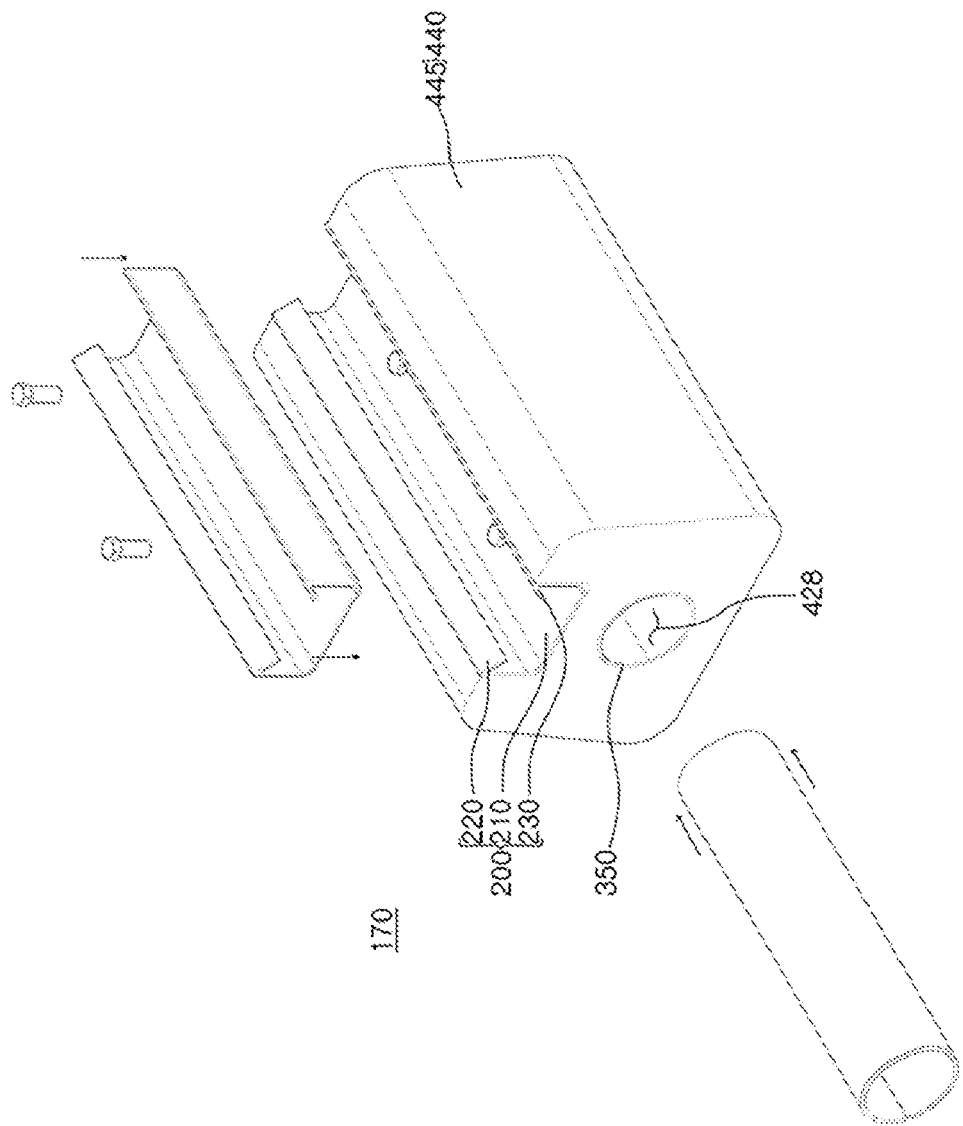
[Figure 8]

[Figure 9]
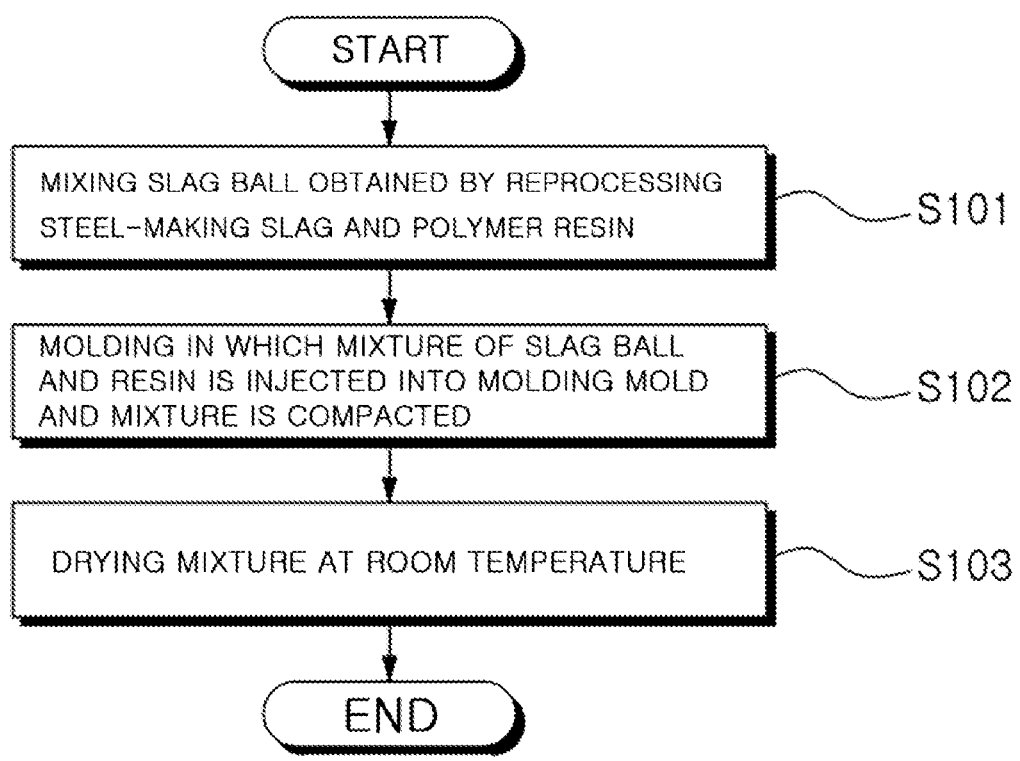

PIPE FIXING DEVICE AND METHOD FOR MANUFACTURING THE SAME

TECHNICAL FIELD

The present invention relates to a fixing device. Specifically, the present invention relates to a pipe fixing device and a method for manufacturing the same.

BACKGROUND ART

Unless otherwise specified in the present specification, the contents described in this identification item are not a prior art regarding the scope of the claims of the present application, and are not recognized as a prior art even if they are described in this identification item.

In general, pipes installed on the ground or on the roof of a building are fixed to the ground or the roof of the building by driving a bolt or a pile into the floor. However, when it is difficult to fix the bolt or the pile in a case where the floor is sand, gravel, or soil, it is often difficult to install the pipes, and when the floor is stone or concrete asphalt, it is difficult to perform maintenance or re-construction work. In addition, there is a drawback that the waterproof function on the roof of the building causes a problem.

In recent years, a fixing device that is disposed between the pipes and the floor to support the pipes. However, when the fixing device is made of rubber or a polymer, the manufacturing cost increases and a product made of concrete has a very long curing period (require 28 days on average), which results in a long production period. Additionally, heavy metals are often contained, which causes environmental pollution.

With regard to this, Korea Laid-open Utility Model Publication No. 20-0172793 discloses a slide-type pipe support device, and Korea Laid-open Patent Publication No. 10-2008820 discloses a pipe support device.

However, the existing invention does not disclose a technique capable of stably supporting the pipe while reducing the manufacturing cost.

DISCLOSURE

Technical Problem

It is an object of the invention to provide a pipe fixing device that requires a less manufacturing cost by reducing the cost for a raw material, is environmentally friendly, and is capable of stably supporting a pipe, and a method for manufacturing the same.

Further, the present invention is not limited to the technical problems described above, and it is obvious that other technical problems may be derived from the following description.

Technical Solution

According to an embodiment of the disclosed invention, a pipe fixing device includes a fixing portion formed in a channel shape in which a first space therein is opened to an outside through an opening formed in an upper portion; and a support coupled to a lower portion of the fixing portion and made of steel-making slag. A part of upper end edges of the fixing portion corresponding to a front and a rear of the opening is formed to be bent toward the first space.

Further, the support portion may be manufactured by combining a slag ball obtained by processing the steel-making slag and a polymer material.

Further, the support portion may be formed to be in close contact with an outer surface of the fixing portion.

Further, in the support portion, a lower end portion may be formed in a plate shape, and an upper end portion may be formed by extending a part of the lower end portion apart from each other upward so as to be coupled to the lower portion of the fixing portion.

Further, the pipe fixing device may further include clamp portions including clamps in which one end of each of the clamps is coupled to the upper end edges, and the other end of each of the clamps passes through the opening and is in close contact with each of one side and the other side of the pipe disposed on the upper portion of the fixing portion to be coupled to each other.

Further, a method for manufacturing a pipe fixing device including a fixing portion and a support portion coupled to the fixing portion to support the fixing portion includes: mixing a slag ball obtained by reprocessing steel-making slag and a polymer resin; molding in which a mixture of the slag ball and the polymer resin is injected into a molding mold and is compacted; and drying the mixture at room temperature to manufacture the support portion.

Further, a composition ratio of the mixture may be the slag ball of 70 to 80 parts by weight, ceramic powder of 5 to 15 parts by weight, a polyurethane resin of 5 to 15 parts by weight, and a hardening agent of 1 to 5 parts by weight.

Advantageous Effects

According to one embodiment disclosed in the present specification, the pipe fixing device supports the pipes at low cost by using slag balls (PS Ball: Precious Slag Ball) made of steel-making slag that is discharged during a process of producing steel in a steel mill and a polymer resin that is mixed with the steel-making slags to couple the steel-making slags to each other.

Further, the pipe fixing device has excellent productivity, production convenience, and durability since the slag ball produced by using the steel-making slag generated in a process of producing pig iron in a blast furnace of a steel mill as a raw material does not generate a heavy metal and is mixed with an environmental friendly composite resin, and has a low risk of electric shock or spark generation since it has no conductivity.

In addition, since the described effects of the present invention are naturally exhibited by the structure of the described contents regardless of whether or not the inventor recognizes the effects, the effects described above are some effects caused by the described contents, and should not be recognized as all effects that are grasped by the inventor or actually exist.

Further, the effect of the present invention should be further grasped by the overall disclosure of the specification. Even though it is not described in an explicit sentence, if the effect of the present invention may be recognized as having such an effect through the present specification by a person having ordinary knowledge in the technical field to which the described contents belong, the effect should be considered as the effect described in the specification.

DESCRIPTION OF DRAWINGS

FIG. 1 is a usage state view of a pipe fixing device according to an embodiment disclosed in the specification.

FIG. 2 illustrates perspective views of the pipe fixing device in FIG. 1 viewed from a different angle.

FIG. 3 is a perspective view of a pipe fixing device according to another embodiment of the specification.

FIGS. 4a and 4b, and FIG. 5 are perspective views of a pipe fixing device according to yet another embodiment of the specification.

FIG. 6 is an exploded perspective view of a pipe fixing device according to yet another embodiment of the specification.

FIG. 7 is an exploded perspective view of a pipe fixing device according to yet another embodiment of the specification.

FIG. 8 is an exploded perspective view of a pipe fixing device according to yet another embodiment of the specification.

FIG. 9 is a flowchart of a method for manufacturing the pipe fixing device in FIG. 1.

BEST MODE

Hereinafter, the configuration, the operation, and the effect of the pipe fixing device according to a preferred embodiment will be described with reference to the accompanying drawings. For reference, in the following drawings, each component is omitted or schematically illustrated for convenience and clarity, and the size of each component does not reflect the actual size. Further, the same reference numerals indicate the same components throughout the specification, and the reference numerals for the same configurations are omitted in the individual drawings.

FIG. 1 illustrates a usage state view of a pipe fixing device according to an embodiment disclosed in the specification. FIG. 2 illustrates perspective views of the pipe fixing device in FIG. 1 viewed from a different angle.

In general, pipes installed on the ground or on the roof of a building are fixed to the ground or the roof of the building by driving a bolt or a pile into the floor. However, when it is difficult to fix the bolt or the pile in a case where the floor is sand, gravel, or soil, it is often difficult to install the pipes, and when the floor is stone or concrete asphalt, it is difficult to perform maintenance or re-construction work. In addition, there is a drawback that the waterproof function on the roof of the building causes a problem.

In recent years, a fixing device that is disposed between the pipes and the floor to support the pipes. However, when the fixing device is made of rubber or a polymer, the manufacturing cost increases and a product made of concrete has a drawback that causes environmental pollution.

A pipe fixing device 100 supports the pipes at low cost by using steel-making slags that are discharged during a process of producing steel in a steel mill and a polymer resin that is mixed with the steel-making slags to harden the steel-making slags.

Further, since the pipe fixing device 100 uses a low-conductivity steel-making slag generated in a process of producing pig iron in a blast furnace of a steel mill, the risk of electric shock or spark generation is low, and manufacturing is convenient.

As illustrated in FIGS. 1 and 2, the pipe fixing device 100 includes a fixing portion 200, a support portion 400, and a clamp portion 600.

The fixing portion 200 is formed in a channel shape in which a first space 205 therein is opened to an outside through an opening 206 formed in an outer upper portion, and a part of upper end edges of the fixing portion 200 corresponding to each of a front and a rear of the opening 206 is formed to be bent toward the first space 205.

The fixing portion 200 includes a frame 210 and stoppers 220 and 230.

The frame 210 is formed in a pipe channel (channel) shape extending long in a first direction 1 corresponding to one side or a second direction 2 corresponding to the other side, and the first space 205 therein is opened in the first direction 1, the second direction 2, and toward the opening 206.

The stopper 220 is formed in a plate shape in which a part of the upper end edge corresponding to the front upper portion of the frame 210 is bent toward the first space 205 and extends to be inclined rearward and downward.

The stopper 230 is formed in a plate shape in which a part of the lower end edge corresponding to the rear upper portion of the frame 210 is bent toward the first space 205 and extends to be inclined frontward and downward.

An upper end portion of the support portion 400 is coupled to the lower portion of the fixing portion 200, and a lower end portion thereof extends downward from the upper end portion in a rectangular parallelepiped shape to be in close contact with the floor. The support portion 400 is made of a composite material made by mixing a slag ball (PS Ball) made of steel-making slag and a polymer resin (polyurethane resin).

The support portion 400 includes a first main body 410.

An upper end portion of the first main body 410 is formed to be in close contact with a front surface, a rear surface, and a bottom surface of the frame 210, and a lower end portion thereof extends downward from a bottom surface of the upper end portion to be in close contact with the floor.

The first main body 410 is manufactured by putting a mixture obtained by mixing the slag ball (PS Ball: Precious Slag Ball) obtained by reprocessing the steel-making slag and the polymer resin (polyurethane) into a molding mold, compacting the mixture, and then drying the mixture at room temperature (5 degrees Celsius or more) for 24 hours.

Specifically, a composition ratio of the mixture is the slag ball of 77 wt % to 82 wt %, silica sand of 10 wt % to 15 wt %, and the polyurethane resin of 2 wt % to 6 wt %, and the mixture may be produced by using the slag ball and the polyurethane resin, excluding the silica sand.

Further, the composition ratio of the mixture is the slag ball of 70 wt % to 80 wt %, powder (ceramic or polymer powder) of 5 wt % to 15 wt %, the polyurethane resin of 5 wt % to 15 wt %, a hardening agent of 1 wt % to 5 wt %, and other additives of 2 wt % to 5 wt %, and the mixture may be produced by using the slag ball and the polyurethane resin, excluding the powder.

The mixture is produced by putting the polyurethane resin, which is prepared in advance, in the process of putting the slag ball and the powder (ceramic or polymer) inside a manual (automatic) mixing device and mixing them, and sufficiently stirring for 5 minutes or more.

The color of the mixture may be changed by mixing the colored powder with the slag ball. The mixture sufficiently stirred in the electric or manual mixing device is injected into a molding mold having a rectangular parallelepiped shape with the internal space opened upward, and then is compacted.

The fixing portion 200 is disposed on the upper portion of the mixture that is compacted firstly and the fixing portion 200 is moved downward, and thus, the fixing portion 200 is inserted into the mixture, and the mixture is compacted downward again in a state where the fixing portion 200 is disposed.

When the mixture that is compacted secondly and the fixing portion 200 are dried at room temperature (5 degrees Celsius or more) for 24 hours, the fixing portion 200 is bonded to the compacted mixture. Then, the mixture and the fixing portion 200 are separated from the molding mold, and the mixture is used as the support portion 400.

Therefore, since the fixing portion 200 is firmly coupled to the support portion 400 by the adhesion of the support portion 400 while the support portion 400 is hardened, a separate coupling port that connects the fixing portion 200 and the support portion 400 with each other is unnecessary.

The first main body 410 manufactured by drying in the molding mold is used after the sharp part of the outer surface is processed in a state of being separated from the molding mold, and the foreign substances generated during the processing are removed.

The polyurethane resin is preferably used as the polymer resin. The polyurethane resin is a polymer having viscosity and adhesiveness, and when it is mixed with the slag ball, the polyurethane resin is hardened while connecting the slag balls to each other to be manufactured as a composite material having an improved durability.

A lower end portion of the clamp portion 600 is coupled to the fixing portion 200 so as to be slidably movable in the first direction 1 or the second direction 2, and an upper end portion thereof is formed to surround a pipe 10 that extends long to the front and the rear, and fixes the pipe 10 to the fixing portion 200.

The slag balls manufactured by reprocessing the steel-making slag may be processed by various methods. In a first step of any one of the methods, the steel-making slags are sieved so as to have a constant particle size range, and the steel-making slag having a uniform particle size is cleaned.

In a second step, the sieved steel-making slag is passed through a belt conveyor and transferred to a drum washing machine, and water is added so that the steel-making slag inside the drum washing machine is rotated in a viscous slurry state.

Meanwhile, before being transferred to the drum washing machine, the steel-making slag may be transferred to a crusher device that extrudes or crushes the steel-making slag to be crushed to a uniform size, and then be transferred to the drum washing machine through the belt conveyor.

In a third step, in the steel-making slurry transferred to a wet-type vibrating body while being supplied with water, separated fine powders are wet-removed, and the steel-making slag particles from which the water has been drained are transferred to a drying furnace to be dried.

The steel-making slags dried in the drying furnace are passed through a dry-type vibrating body so that small fine powders remaining with the steel-making slag are removed, and the slag ball processed from the steel-making slag separately produced in this manner passes through a storage tank and is packed.

In the slag balls processed from the steel-making slags dried in the drying furnace, iron content remaining therein may be separated by a magnetic force sorter, and if necessary, the iron content removal process by the magnetic force sorter may be omitted.

The clamp portion 600 includes a first clamp 610 and a second clamp 620.

One end of the first clamp 610 is formed in a plate shape, is inserted into the first space 205, and is coupled to the stoppers 220 and 230 to be slidably movable in the first direction 1 or the second direction 2 through a sliding groove each formed in the front and the rear.

The other end of the first clamp 610 extends upward from the one end by a predetermined distance so as to pass through the opening 206 and extend in the second direction 2 and upward while surrounding one side surface of the pipe 10 and forming a curved surface.

One end of the second clamp 620 is formed in a plate shape, is inserted into the first space 205, and is coupled to the stoppers 220 and 230 to be slidably movable in the first direction 1 or the second direction 2 through a sliding groove each formed in the front and the rear.

The other end of the second clamp 620 extends upward from the one end by a predetermined distance so as to pass through the opening 206, and extend in the first direction 1 and upward while surrounding the other side surface of the pipe 10 forming a curved surface.

The other end of each of the first clamp 610 and the second clamp 620 is coupled to each other via a bolt at the upper portion of the pipe 10, and the other ends of the first clamp 610 and the second clamp 620 tighten or loosen the pipe 10 downward according to a rotation direction of the bolt.

When the other end of each of the first clamp 610 and the second clamp 620 is coupled to each other via the bolt at the upper portion of the pipe 10, one end of each of the first clamp 610 and the second clamp 620 is moved upward in a state of being in close contact with the stoppers 220 and 230 so as to be firmly coupled to the stoppers 220 and 230. Therefore, one end of each of the first clamp 610 and the second clamp 620 is restricted from being moved slidably in the first direction 1 or the second direction 2 along the stoppers 220 and 230.

Therefore, the pipe fixing device 100 has an improved economic feasibility since it is manufactured by using the slag balls obtained by reprocessing the steel-making slag generated in a steel mill, is environmentally friendly, and is less affected by an external temperature change.

Further, the pipe fixing device 100 is less affected by water or moisture, has excellent durability as compared with conventional concrete, rubber, or polymer products, and may be molded in various shapes.

FIG. 3 illustrates a perspective view of a pipe fixing device according to another embodiment of the specification.

Since a pipe fixing device 120 according to the embodiment is substantially the same as the pipe fixing device 100 in FIGS. 1 and 2 except for a support portion 500, the same reference numbers and names are used, and duplicate descriptions will be omitted.

As illustrated in FIG. 3, the pipe fixing device 120 includes the support portion 500.

A lower end portion of the support portion 500 is formed in a plate shape and is in close contact with the floor, and an upper end portion thereof is formed by protruding parts of the lower end portion apart from each other upward by a predetermined distance, and is detachably coupled to the bottom surface of the fixing portion 200.

Specifically, the support portion 500 includes a second main body 510, and the second main body 510 includes a frame 511, protrusions 512 and 513, and a reinforcing unit 514.

A lower end portion of the second main body 510 is formed in a plate shape and is in close contact with the floor, and an upper end portion thereof is formed by protruding parts of the lower end portion apart from each other upward by a predetermined distance, and is detachably coupled to the bottom surface of the fixing portion 200.

The second main body 510 is manufactured by mixing the slag balls obtained by reprocessing the steel-making slag and the polyurethane resin with each other, injecting the mixture into the molding mold, and then drying the mixture, and is preferably hardened inside the molding mold at a temperature of 5 degrees Celsius or more for 24 hours.

The frame 511 is formed in a rectangular plate shape extending long in the first direction 1 or the second direction 2, and is in close contact with the floor so as to stably support the fixing portion 200 coupled to the upper portion of the support portion 500 and the pipe 10.

A lower end portion of the protrusion 512 is formed in a rectangular plate shape and is connected to the upper portion of the frame 511 in the first direction 1 side, and an upper end portion thereof extends upward from the lower end portion in a pyramid (quadrangular pyramid) shape by a predetermined distance to be coupled to the bottom surface of the fixing portion 200.

A lower end portion of the protrusion 513 is formed in a rectangular plate shape and is connected to the upper portion of the frame 511 in the second direction 2 side, and an upper end portion thereof extends upward from the lower end portion in a quadrangular pyramid shape by a predetermined distance to be coupled to the bottom surface of the fixing portion 200.

The reinforcing unit 514 protrudes upward from the upper surface of the frame 511 in a partition wall shape in a space between the protrusions 512 and 513, and suppresses deformation due to an external force applied to the frame 511.

Specifically, a central portion of the reinforcing unit 514 is formed in a cylindrical shape in which a space therein is opened upward and downward so that a lower rim is coupled to the frame 511, and an outer portion extends in a partition wall shape from the central portion toward each of corners of the frame 511 by a predetermined distance.

Therefore, the frame 511 is effectively prevented from being folded or deformed by the reinforcing unit 514 when a force that causes deformation of the central portion of the frame 511 is applied by an external force or an external environment.

In the fixing portion 200, each of bolts 516 penetrates through the fixing portion 200 at the upper portion of the fixing portion 200 and is inserted toward the upper end portion of each of the protrusions 512 and 513 so that each of the fixing portion 200 and the protrusions 512 and 513 are screwed.

Therefore, the pipe fixing device 120 is suppressed from being deformed while securing durability by using a minimum amount of material, and stably supports the fixing portion 200 and the pipe 10 coupled to the fixing portion 200.

Meanwhile, the clamp portion 600 coupled to the pipe fixing device 100 in FIG. 1 and the pipe 10 coupled to the upper portion of the pipe fixing device 100 via the clamp portion 600 may be disposed in the fixing portion 200 of the pipe fixing device 120 in the same shape.

FIGS. 4a and 4b, and FIG. 5 illustrate perspective views of a pipe fixing device according to yet another embodiment of the specification.

Since a pipe fixing device 140 according to the embodiment is substantially the same as the pipe fixing device 100 in FIGS. 1 and 2 except for a support portion 700, the same reference numbers and names are used, and duplicate descriptions will be omitted.

As illustrated in FIGS. 4a and 4b, and FIG. 5, the pipe fixing device 140 includes the fixing portion 700, bolts 800, and a support plate 820.

The pipe fixing device 140 is manufactured by filling the inside of a polymer case that covers the outside with the mixture obtained by mixing the slag ball obtained by reprocessing the steel-making slag and the polyurethane resin and compacting the mixture. Therefore, the appearance is beautiful, the durability is improved, and the manufacturing cost is reduced.

The support portion 700 includes a third main body 710, a fourth main body 720, spacers 730, 740, and 740, fillers 760, 770, 772, and 774, a first cover 780, and a second cover 790.

The support portion 700 is constituted by the outer third main body 710 and the fourth main body 720 inserted to the inside of the third main body 710, and the inside of the third main body 710 is filled with the fillers 760, 770, 772, and 774.

Further, the support portion 700 may be used as the pipe fixing device 140 by separating the fourth main body 720 inside and then filling the inside of the third main body 710 with the fillers 760, 770, 772, and 774, and the inside of the separated fourth main body 720 may be filled with the filler 760 so as to be additionally used in an emergency.

Specifically, the third main body 710 is formed in a tubular shape having an isosceles trapezoid cross section and extending long in the first direction 1 or the second direction 2, and a part of an upper surface thereof is dented downward by a predetermined distance in a rectangular parallelepiped shape to form an upper groove 701.

The fourth main body 720 is formed to be relatively smaller than the third main body 710, and is formed in a tubular shape having an isosceles trapezoid cross section and extending long in the first direction 1 or the second direction 2, and a part of an upper surface thereof is dented downward by a predetermined distance in a rectangular parallelepiped shape to form an upper groove 702.

A second space 721 is formed between the third main body 710 and the fourth main body 720 in a state where the third main body 710 is inserted into a first space 711 of the third main body 710, and the spacers 730, 740, and 750 are disposed in the second space 721 so as to maintain the second space 721 formed between the third main body 710 and the fourth main body 720.

The spacer 730 is formed in a rectangular parallelepiped stick shape extending long in the first direction 1 or the second direction 2, and is disposed in the second space 721 corresponding to a rear lower portion of the fourth main body 720. An upper surface thereof is in close contact with a bottom surface of the fourth main body 720, and a bottom surface thereof is in close contact with a lower inner surface of the third main body 710.

The spacer 740 is formed in a rectangular parallelepiped stick shape extending long in the first direction 1 or the second direction 2, and is disposed in the second space 721 corresponding to a front lower portion of the fourth main body 720. An upper surface thereof is in close contact with the bottom surface of the fourth main body 720, and a bottom surface thereof is in close contact with the lower inner surface of the third main body 710.

The spacer 750 is formed in a rectangular parallelepiped stick shape extending long in the first direction 1 or the second direction 2, and is disposed in the second space 721 positioned in the upper groove 702 of the fourth main body 720. An upper surface thereof is in close contact with an upper inner surface of the third main body 710, and a bottom surface thereof is in close contact with the upper surface of the fourth main body 720.

In the spacer 750, bolt holes that vertically penetrate the spacer 750 and are disposed to be apart from each other at uniform intervals along the first direction 1 or the second direction 2. Each of the bolts 800 penetrates the upper portion of the third main body 710, extends downward along the bolt holes, and penetrates the fourth main body 720.

Therefore, the fourth main body 720 is stably disposed inside the third main body 710 by the bolts 800 that penetrate each of the third main body 710, the spacer 750, and the fourth main body 720 and couple the third main body 710, the spacer 750, and the fourth main body 720 to each other.

The filler 760 is a mixture of the slag ball obtained by reprocessing the steel-making slag and the polyurethane resin, and is filled inside the third main body 710 to maintain the shape of the third main body 710. The filler 760 is compacted and mixed inside the third main body 710 and is in close contact with the inner surface of the third main body 710.

The filler 770 is a mixture of the slag ball obtained by reprocessing the steel-making slag and the polyurethane resin, and is formed in a plate shape extending in the first direction 1 or the second direction 2 while being filled and compacted in the second space 721 between the spacers 730 and 740.

The filler 772 is a mixture of the slag ball obtained by reprocessing the steel-making slag and the polyurethane resin, and is formed in a shape surrounding a front outer surface of the fourth main body 720 in the second space 721 while being filled and compacted in the second space 721 between the spacers 730 and 750.

The filler 774 is a mixture of the slag ball obtained by reprocessing the steel-making slag and the polyurethane resin, and is formed in a shape surrounding a rear outer surface of the fourth main body 720 in the second space 721 while being filled and compacted in the second space 721 between the spacers 740 and 750.

Each of the first cover 780 and the second cover 790 includes a cover frame 782 and first to fourth insertion units 783, 784, 785, and 786.

The first cover 780 is moved from the second direction 2 of the third main body 710 in the first direction 1 so as to be coupled to the third main body 710 and the fourth main body 720, and seals the other side of the first space 711 in a state of being coupled to the third main body 710 and the fourth main body 720.

The second cover 790 is moved from the first direction 1 of the third main body 710 in the second direction 2 so as to be coupled to the third main body 710 and the fourth main body 720, and seals one side of the first space 711 in a state of being coupled to the third main body 710 and the fourth main body 720.

The cover frame 782 is formed in a plate shape having an isosceles trapezoid shape, and a part of the upper center is dented downward in a rectangular shape to form a cover upper groove connected to the upper groove 701.

In a state where the cover frame 782 is coupled to the third main body 710, a rim of the cover frame 782 is in close contact with a rim of the third main body 710 so that an outer surface of the cover frame 782 and an outer surface of the third main body 710 form a plane with each other.

One end of the first insertion unit 783 is formed to have the cross section in an isosceles trapezoid shape including a groove on the upper portion, and is coupled to the cover frame 782 at the position corresponding to the inner side of the cover frame 782. The other end thereof extends from the one end toward the first space 711 by a predetermined distance so as to be inserted to the inside of the fourth main body 720.

In a state where the first insertion unit 783 is inserted to the inside of the fourth main body 720, an outer surface of the first insertion unit 783 is in close contact with an inner surface of the fourth main body 720, and in the process of coupling the first cover 780 and the third main body 710, the filler 770 is pressed.

In the process of coupling the first cover 780 and the second cover 790 to the third main body 710, each of the first insertion units 783 formed in each of the first cover 780 and the second cover 790 presses and compacts the filler 760.

The second insertion unit 784 is formed in a plate shape extending long frontward or rearward and is coupled to the cover frame 782 in the first direction 1 at the position corresponding to a central lower portion of the first insertion unit 783.

In a state where the first cover 780 is coupled to the third main body 710, the second insertion unit 784 is inserted into the second space 721 between the spacers 730 and 740, and an outer surface of the second insertion unit 784 is in close contact with the spacers 730 and 740, the inner surface of the third main body 710, and the outer surface of the fourth main body 720.

In the process of coupling the first cover 780 and the second cover 790 to the third main body 710, each of the second insertion units 784 formed in each of the first cover 780 and the second cover 790 presses and compacts the filler 770.

In a state where the first cover 780 is coupled to the third main body 710, the third insertion unit 785 is inserted into a part of the second space 721 between the spacers 730 and 750, and in a state of being inserted into the second space 721, an outer surface of the third insertion unit 785 is in close contact with the inner surface of the third main body 710, and the outer surface of the fourth main body 720.

In the process of coupling the first cover 780 and the second cover 790 to the third main body 710, each of the third insertion units 785 formed in each of the first cover 780 and the second cover 790 presses and compacts the filler 772 filled in the second space 721.

In a state where the first cover 780 is coupled to the third main body 710, the fourth insertion unit 786 is inserted into a part of the second space 721 between the spacers 740 and 750, and in a state of being inserted into the second space 721, an outer surface of the fourth insertion unit 786 is in close contact with the inner surface of the third main body 710, and the outer surface of the fourth main body 720.

In the process of coupling the first cover 780 and the second cover 790 to the third main body 710, each of the fourth insertion units 786 formed in each of the first cover 780 and the second cover 790 presses and compacts the filler 774 filled in the second space 721.

Therefore, when each of the first cover 780 and the second cover 790 is coupled to the third main body 710 in the first direction 1 and the second direction 2, respectively, each of the first to fourth insertion units 783, 784, 785, and 786 presses each of the fillers 760, 770, 772, and 774, and thus, the operation of separately compacting the fillers 760, 770, 772, and 774 is unnecessary.

Meanwhile, the fourth main body 720 may be separated to the outside of the third main body 710 by separating the bolts 800 from the fourth main body 720, and in a state of being separated to the outside, the fixing portion 200 may be coupled to the upper portion of the fourth main body 720.

Further, the support plate 820 extending long in the first direction 1 or the second direction 2 may be in close contact with the upper surface positioned in the upper groove 702 formed in the upper portion of the fourth main body 720, and then the fixing portion 200 may be coupled to the fourth main body 720 via the bolts 800.

The vertical thickness of the support plate 820 is determined to a distance, in a state where the fourth main body 720 and the third main body 710 are separated from each other and disposed on the ground, between a horizontal line of the upper surface of the fourth main body 720 corresponding to the upper groove of the fourth main body 720 and a horizontal line of the upper surface of the third main body 710 positioned in the upper groove 701 of the third main body 710.

The height of the fixing portion 200 coupled to the fourth main body 720 via the support plate 820 is positioned on the horizontal line equal to the fixing portion 200 coupled to the upper portion of the third main body 710, and thus, the operator may stably support the pipe 10 that is supportable by the fourth main body 720 by using the support plate 820.

Meanwhile, in a state where the third main body 710 and the fourth main body 720 are coupled to each other, the fixing portion 200 may be coupled to the upper inner surface of the fourth main body 720 in the first space 711 via the bolts 800, and thus, the portability or the transportation convenience of the fixing portion 200 is improved.

Further, in the state where the third main body 710 and the fourth main body 720 are coupled to each other, the support plate 820 may be coupled to the inner side of the fixing portion 200 in the first space 711 via the bolts 800, and thus, the portability or the transportation convenience of the support plate 820 is improved.

FIG. 6 illustrates an exploded perspective view of a pipe fixing device according to yet another embodiment of the specification.

Since a pipe fixing device 150 according to the embodiment is substantially the same as the pipe fixing device 100 in FIGS. 1 and 2 except for a support portion 420, the same reference numbers and names are used, and duplicate descriptions will be omitted.

An upper end portion of the support portion 420 is coupled to the lower portion of the fixing portion 200, and a lower end portion thereof extends downward while parts of the front and the rear of the upper end portion are apart from each other to surround a lower space 426 having an isosceles trapezoid cross section.

The support portion 420 may be made of a composite material made of the slag ball (PS Ball) made of the steel-making slag and the polymer resin (urethane material), and may be configured to contain the slag ball, ceramic particles containing silicon, and a polymer resin (adhesive).

The polymer resin may be a polyurethane resin, and the polyurethane resin may be manufactured as a two-component urethane adhesive consisting of a main agent and a hardening agent.

Therefore, the manufacturing cost and the weight of the support portion 420 are reduced due to the lower space 426, and the support portion 420 stably supports the pipe 10 when used in a region with an uneven ground.

The support portion 420 includes a fifth main body 425.

An upper end portion of the fifth main body 425 is formed to be in close contact with a front surface, a rear surface, and a bottom surface of the frame 210, and a lower end portion thereof extends downward from a bottom surface of the upper end portion while parts of the front and the rear are apart from each other and is in close contact with the floor.

The fifth main body 425 is manufactured by mixing the slag ball obtained by reprocessing the steel-making slag and the polyurethane resin, putting the mixture into the molding mold, compacting the mixture, and then drying the mixture at room temperature (5 degrees Celsius or more) for 24 hours.

The fifth main body 425 manufactured by drying in the molding mold is used after the sharp part of the outer surface is processed in a state of being separated from the molding mold, and the foreign substances generated during the processing are removed.

The polyurethane resin is preferably used as the polymer resin. The polyurethane resin is a polymer having viscosity and adhesiveness, and when it is mixed with the slag ball obtained by reprocessing the steel-making slag, the polyurethane resin is hardened while connecting the slag balls to each other to be manufactured as a composite material having an improved durability.

FIG. 7 illustrates an exploded perspective view of a pipe fixing device according to yet another embodiment of the specification.

Since a pipe fixing device 160 according to the embodiment is substantially the same as the pipe fixing device 100 in FIGS. 1 and 2 except for an auxiliary fixing portion 300 and a support portion 430, the same reference numbers and names are used, and duplicate descriptions will be omitted.

The pipe fixing device 160 includes the auxiliary fixing portion 300 and the support portion 430.

An upper end portion of the support portion 430 is coupled to the lower portion of the fixing portion 200, and a lower end portion thereof extends downward while parts of the front and the rear of the upper end portion are apart from each other to surround a lower space 427 having an isosceles trapezoid shape extending in the first direction 1 or the second direction 2.

The support portion 430 may be manufactured by mixing the slag ball (PS Ball) made of the steel-making slag and the polyurethane resin, and may be configured to contain the slag ball, ceramic particles containing silicon, and a polymer resin (adhesive).

The polymer resin may be a polyurethane resin, and the polyurethane resin may be manufactured as a two-component urethane adhesive consisting of a main agent and a hardening agent.

Therefore, the manufacturing cost and the weight of the support portion 430 are reduced due to the lower space 427, and the support portion 430 stably supports the pipe 10 when used in a region with an uneven ground.

The support portion 430 includes a sixth main body 435.

An upper end portion of the sixth main body 435 is formed to be in close contact with the front surface, the rear surface, and the bottom surface of the frame 210, and a lower end portion thereof extends downward from a bottom surface of the upper end portion while parts of the front and the rear are apart from each other and is in close contact with the floor.

The sixth main body 435 is manufactured by mixing the slag ball obtained by reprocessing the steel-making slag and the polyurethane resin, putting the mixture, compacting the mixture, and then drying the mixture at room temperature (5 degrees Celsius or more) for 24 hours.

The sixth main body 435 manufactured by drying in the molding mold is used after the sharp part of the outer surface is processed in a state of being separated from the molding mold, and the foreign substances generated during the processing are removed.

The polyurethane resin is preferably used as the polymer resin. The polyurethane resin is a polymer having viscosity and adhesiveness, and when it is mixed with the slag ball obtained by reprocessing the steel-making slag, the polyurethane resin is hardened while connecting the slag balls to each other to be manufactured as a composite material having an improved durability.

The auxiliary fixing portion 300 includes an auxiliary frame 310, a stopper 320, and a stopper 330.

The auxiliary fixing portion 300 is formed in a channel shape in which a space therein is opened downward, is inserted into the lower space 427 of the support portion 430, is coupled to the support portion 430, and is formed to have a vertical thickness relatively smaller than that of the fixing portion 200.

Therefore, when the pipe 10 is disposed at a relative high position, the operator may turn the support portion 430 so that the auxiliary fixing portion 300 faces to the upper portion, and couple the clamp portion 600 to the auxiliary fixing portion 300 so as to support the pipe 10.

Further, the operator may conveniently align a plurality of pipe fixing devices 160 disposed under the pipe 10 extending in a straight line linearly by using the lower space 427 inside the auxiliary fixing portion 300.

For example, the plurality of pipe fixing devices 160 may be conveniently aligned linearly by inserting a guide stick having a rectangular parallelepiped shape extending long in the first direction 1 or the second direction 2 into the lower space 427 of each of the plurality of pipe fixing devices 160.

The frame 310 is formed in a pipe channel (channel) shape extending long in the first direction 1 corresponding to one side or the second direction 2 corresponding to the other side, and the space therein is opened in the first direction 1, the second direction 2, and downward.

The stopper 320 is formed in a plate shape in which a part of the upper end edge corresponding to the front upper portion of the frame 310 is bent toward the first space 427 and extends to be inclined rearward and upward.

The stopper 330 is formed in a plate shape in which a part of the upper end edge corresponding to the front upper portion of the frame 310 is bent toward the first space 427 and extends to be inclined frontward and upward.

When manufacturing the pipe fixing device 160, the operator may insert the fixing portion 200 and the auxiliary fixing portion 300, which are connected to each other, into a rectangular parallelepiped shape molding mold in which the space therein is opened upward, and then, inject the mixture obtained by mixing the polyurethane resin and the slag ball into the molding mold.

In this case, the fixing portion 200 and the auxiliary fixing portion 300 may be inserted into the molding mold in a state of being connected to each other via the bolts 800 apart from each other along the first direction 1 or the second direction 2.

FIG. 8 illustrates an exploded perspective view of a pipe fixing device according to yet another embodiment of the specification.

Since a pipe fixing device 170 according to the embodiment is substantially the same as the pipe fixing device 100 in FIGS. 1 and 2 except for an auxiliary fixing portion 350 and a support portion 440, the same reference numbers and names are used, and duplicate descriptions will be omitted.

The pipe fixing device 170 includes the auxiliary fixing portion 350 and the support portion 440.

An upper end portion of the support portion 440 is coupled to the lower portion of the fixing portion 200, and a lower end portion thereof extends downward while parts of the front and the rear of the upper end portion are apart from each other to surround a lower space 428 having a cylinder shape extending in the first direction 1 or the second direction 2.

The support portion 440 may be manufactured by a composite material manufactured by the slag ball (PS Ball) made of the steel-making slag and the polyurethane resin, and may be configured to contain the slag ball, ceramic particles containing silicon, and a polymer resin (adhesive).

The polyurethane resin may be manufactured as a two-component urethane adhesive consisting of a main agent and a hardening agent.

Therefore, the manufacturing cost and the weight of the support portion 440 are reduced due to the lower space 428, and the support portion 440 stably supports the pipe 10 when used in a region with an uneven ground.

The support portion 440 includes a seventh main body 445.

An upper end portion of the seventh main body 445 is formed to be in close contact with a front surface, a rear surface, and a bottom surface of the frame 210, and a lower end portion thereof extends downward from a bottom surface of the upper end portion while parts of the front and the rear are apart from each other and is in close contact with the floor.

The seventh main body 445 is manufactured by mixing the slag ball obtained by reprocessing the steel-making slag and the polyurethane resin, putting the mixture into the molding mold, compacting the mixture, and then drying the mixture at room temperature (5 degrees Celsius or more) for 24 hours.

The seventh main body 445 manufactured by drying in the molding mold is used after the sharp part of the outer surface is processed in a state of being separated from the molding mold, and the foreign substances generated during the processing are removed.

The polyurethane resin is preferably used as the polymer resin. The polyurethane resin is a polymer having viscosity and adhesiveness, and when it is mixed with the slag ball obtained by reprocessing the steel-making slag, the polyurethane resin is hardened while connecting the slag balls to each other to be manufactured as a composite material having an improved durability.

The auxiliary fixing portion 350 is formed in a cylindrical shape extending long in the first direction 1 or the second direction 2 and is inserted into the lower space 428 of the support portion 440, and the outer surface thereof is in close contact with the inner surface of the support portion 440 so as to be coupled to the polyurethane resin, and thus, a separate fixing device is unnecessary.

The operator may conveniently align a plurality of pipe fixing devices 170 disposed under the pipe 10 extending in a straight line linearly by using the lower space 428 inside the auxiliary fixing portion 350.

For example, the plurality of pipe fixing devices 170 may be conveniently aligned linearly by inserting a guide stick having a cylinder shape extending long in the first direction 1 or the second direction 2 into the lower space 428 of each of the plurality of pipe fixing devices 170.

Further, in a region where it rains frequently, the lower space 428 inside the auxiliary fixing portion 350 provides a passage for water to flow down, and thus, ground erosion is prevented.

When manufacturing the pipe fixing device 170, a part of the mixture is put into the rectangular parallelepiped shape molding mold in which the space therein is opened upward and the auxiliary fixing portion 350 is inserted thereto, and then, a part of the mixture is injected into the molding mold again.

After compacting the mixture surrounding the auxiliary fixing portion 350 and injecting the mixture into the molding mold again, the fixing portion 200 is inserted into the molding mold and the mixture is hardened to complete the pipe fixing device 170.

Meanwhile, the polyurethane resin may be formed in a liquid or gel form, and it is preferable to use a liquid polyurethane resin. When using the liquid polyurethane resin, KS F 4937 Parking Lot Floor Surface Finishing Material Unicrete A-liquid Grey Glossy AU-8551 (Dong) [29462-8551] Product (name: Unicrete) sold by Jeongseok Chemical may be used, or Unicrete may be used by mixing with color powder.

FIG. 9 illustrates a flowchart of a method for manufacturing the pipe fixing device in FIG. 1.

As illustrated in FIG. 9, the method for manufacturing the pipe fixing device 100 includes mixing the slag ball obtained by reprocessing steel-making slag and a polymer resin (S101), molding in which the mixture of the slag ball and the resin is injected into the molding mold and is compacted (S102), and drying the mixture at room temperature (S103).

In the mixing (S101), the slag ball obtained by reprocessing the steel-making slag and the polyurethane resin is mixed with each other using a mixing device to form the mixture, and the mixture is stirred for a predetermined time so as to control the slag ball to be uniformly distributed (step S101).

Specifically, a composition ratio of the mixture is the slag ball of 77 wt % to 82 wt %, silica sand of 10 wt % to 15 wt %, and the polyurethane resin of 3 wt % to 13 wt %, and the mixture may be produced by using the slag ball and the polyurethane resin, excluding the silica sand (step S101).

Further, the composition ratio of the mixture is the slag ball of 70 wt % to 80 wt %, powder (ceramic or polymer powder) of 5 wt % to 15 wt %, the polyurethane resin of 5 wt % to 15 wt %, a hardening agent of 1 wt % to 5 wt %, and other additives of 2 wt % to 5 wt %, and the mixture may be produced by using the slag ball and the polyurethane resin, excluding the powder (step S101).

Meanwhile, when calculated in parts by weight, a composition ratio of the mixture may be the slag ball of 70 to 80 parts by weight, ceramic powder of 5 to 15 parts by weight, a polyurethane resin of 5 to 15 parts by weight, and a hardening agent of 1 to 5 parts by weight.

In the molding (S102), the mixture is injected into the molding mold surrounding the space having the same shape as the support portion 400, and the mixture injected into the molding mold is compacted by a pressing unit inserted through an opening of the molding mold (step S102).

When the mixture is compacted, the fixing portion 200 is inserted on the upper portion of the support portion 400 so that the front surface, the rear surface, and the bottom surface of the fixing portion 200 are in close contact with the support portion 400, and when the mixture is hardened, the fixing portion 200 is firmly coupled to the support portion 400 by the adhesion of the mixture (step S102).

In the drying (S103), the mixture compacted in the molding mold is hardened at room temperature (5 degrees Celsius or more) for 24 hours to be hardened, and the hardened mixture is separated from the molding mold and is used as the support portion 400 (step S103).

Although the preferred embodiments of the present invention have been described with reference to the accompanying drawings, the embodiments described in the specification and the configurations illustrated in the drawings are merely preferred embodiments of the present invention, and do not represent all the technical ideas of the present invention, and thus, it should be understood that there may be various equivalents and modifications that may substitute the embodiments at the time of filing the present application. Therefore, it should be understood that the embodiments described above are exemplary and not restrictive in all aspects, and the scope of the present invention is defined by the following claims rather than the detailed description, and all changes or modifications derived from the meaning and the scope of the claims and the equivalent concepts thereof should be construed as being included in the scope of the present invention.

DESCRIPTION OF SYMBOL 100, 120, 140, 150, 160, 170: Pipe fixing device
200: Fixing portion
400, 500: Support portion
600: Clamp portion

INDUSTRIAL APPLICABILITY

The pipe fixing device is a device for fixing a pipe, and may be used for home or industry.

The invention claimed is:

1. A pipe fixing device comprising:
a fixing portion formed in a channel shape in which a first space therein is opened to an outside through an opening formed in an upper portion;
a support portion manufactured by injecting a mixture formed by mixing a slag ball obtained by reprocessing steel-making slag and a polymer resin into a molding mold, compacting the mixture, and then drying the mixture at room temperature, and coupled to a lower portion of the fixing portion,
wherein a part of upper end edges of the fixing portion corresponding to a front and a rear of the opening is formed to be bent toward the first space, and
a pipe is fixed via clamps in which one end of each of the clamps is fastened at the upper end edge in a hook shape with the pipe therebetween and the other end of each of the clamps extends upward from the one end so as to surround the pipe and be coupled to each other; and
an auxiliary fixing portion being formed in a channel shape or a cylindrical shape and extending long in a channel direction or a cylindrical direction, wherein the auxiliary fixing portion connects one side and the other side of the support portion so as to penetrate the support portion in the channel direction or the cylindrical direction, wherein as the auxiliary fixing portion is connected to the support portion, a length of the auxiliary fixing portion is same as a length of the support portion.

2. The pipe fixing device according to claim 1,
wherein, in the support portion, a lower end portion is formed in a plate shape, and an upper end portion is formed by extending a part of the lower end portion separated from each other upward so as to be coupled to the lower portion of the fixing portion.

3. A method for manufacturing a pipe fixing device comprising a fixing portion and a support portion coupled to the fixing portion to support the fixing portion, the method comprising:

mixing a slag ball obtained by reprocessing steel-making slag and a polymer resin;

molding in which a mixture of the slag ball and the polymer resin is injected into a molding mold and is compacted, wherein an auxiliary fixing portion is inserted in the molding mod and then the mixture is injected into the molding mold again; and drying the mixture at room temperature to manufacture the support portion wherein the auxiliary fixing portion is formed in a channel shape or a cylindrical shape and extending long in a channel direction or a cylindrical direction, the auxiliary fixing portion connecting one side and the other side of the support portion so as to penetrate the support portion in the channel direction or the cylindrical direction, wherein as the auxiliary fixing portion is connected to the support portion, a length of the auxiliary fixing portion is same as a length of the support portion.

4. The manufacturing method according to claim 3, wherein a composition ratio of the mixture includes the slag ball of 70 to 80 parts by weight, ceramic powder of 5 to 15 parts by weight, a polyurethane resin of 5 to 15 parts by weight, and a hardening agent of 1 to 5 parts by weight.

* * * * *